United States Patent [19]

Gac et al.

[11] Patent Number: 4,726,829
[45] Date of Patent: Feb. 23, 1988

[54] FABRICATION OF PRECISION GLASS SHELLS BY JOINING GLASS RODS

[75] Inventors: Frank D. Gac, Los Alamos; Rodger D. Blake, Santa Fe, both of N. Mex.; Delbert E. Day, Rolla, Mo.; John S. Haggerty, Lincoln, Mass.

[73] Assignee: The United States of America as represented by the Department of Energy, Washington, D.C.

[21] Appl. No.: 942,148

[22] Filed: Dec. 16, 1986

[51] Int. Cl.$^4$ ............................................. C03B 19/10
[52] U.S. Cl. ........................................ 65/21.4; 65/22; 65/61; 65/142
[58] Field of Search ................... 65/21.4, 22, 56, 142, 65/61, 25.1, 26

[56] References Cited

U.S. PATENT DOCUMENTS

| | | | |
|---|---|---|---|
| 2,052,100 | 8/1936 | McMaster | 65/26 |
| 2,201,049 | 5/1940 | Moore | 65/26 |
| 3,116,137 | 12/1963 | Vasilos et al. | 65/22 X |
| 3,607,171 | 9/1971 | Hirsch | 65/22 |
| 4,433,461 | 2/1984 | Ishikawa et al. | 65/22 X |

Primary Examiner—Robert L. Lindsay
Attorney, Agent, or Firm—Milton D. Wyrick; Paul D. Gaetjens; Judson R. Hightower

[57] ABSTRACT

A method for making uniform spherical shells. The present invention allows uniform hollow spheres to be made by first making a void in a body of material. The material is heated so that the viscosity is sufficiently low so that the surface tension will transform the void into a bubble. The bubble is allowed to rise in the body until it is spherical. The excess material is removed from around the void to form a spherical shell with a uniform outside diameter.

13 Claims, 6 Drawing Figures

FABRICATION OF PRECISION GLASS SHELLS BY JOINING GLASS RODS

BACKGROUND OF THE INVENTION

The present invention relates generally to a method for making uniform spheres. Uniform glass spheres are used for a number of purposes including as targets for inertial confinement fusion. This invention is the result of a contract with the Department of Energy (Contract No. W-7405-ENG-36).

One common method of making uniform glass shells for use in laser fusion applications is a drop column method. Using this technique, a liquid droplet of glass forming material is generated and passed through multiple temperature zones to dry the drops and form small glass spheres. This type of technique is illustrated in U.S. Pat. No. 4,163,637.

An alternative to this method is described in U.S. Pat. No. 4,548,767 issued to Hendricks in which small hollow spheres are made by first producing uniform drops made of heat decomposable or vaporizable material. These drops are then evaporated or decomposed to produce dried particles. The particles are coated with a layer of shell coating material which results in coated particles having uniform size. These uniform size coated particles are then heated to melt the layer of shell forming material and to decompose or vaporize the coated particles producing an expanding gas bubble inside the shell forming material. The shell is then cooled to a temperature below its softening point to cool the portions of the glass shell with a thin wall thickness more quickly than the portion of the shell which have a greater wall thickness. At the same time, the external pressure on the shell is decreased to a pressure below the pressure within the shell. This results in a shell which is not spherical but which has a uniform wall thickness. In order to make the shell spherical, the Hendricks patent teaches to then increase the external pressure on the shell. The resulting spherical shell is then cooled.

The subject invention enables larger glass shells to be produced than previously obtainable using conventional methods. In addition, the subject invention allows the user to form hollow spheres which have a uniform wall thickness.

It is the object of the present invention to make uniform spherical glass shells having a minimum inside and outside distortion.

SUMMARY OF THE INVENTION

To achieve the foregoing object, and in accordance with the purposes of the present invention as embodied and broadly described herein, the method of making spherical glass shells is achieved by forming a void of known volume within a glass body. The body is then heated so that the viscosity of the body is sufficiently low that the surface tension will transform the void into a bubble.

Because of the buoyant forces, the bubble moves upward through the low viscosity glass body becoming more spherical as it rises. The temperature is maintained for a sufficient time to allow the void to be spherical. The glass is then cooled to suspend the spherical void within the glass body. Finally, excess material from around the void is removed to form a hollow glass sphere.

Another aspect of this invention is that the bubble may be filled with any desired gas by having the original cavity filled with the gas.

BRIEF DESCRIPTION OF THE DRAWINGS

The accompanying drawings, which are incorporated in and form a part of the specification, illustrate the apparatus used in the present invention and, together with the description, serve to explain the principles of the invention. In the drawings.

DETAILED DESCRIPTION OF THE PREFERRED EMBODIMENT

Figure 1:
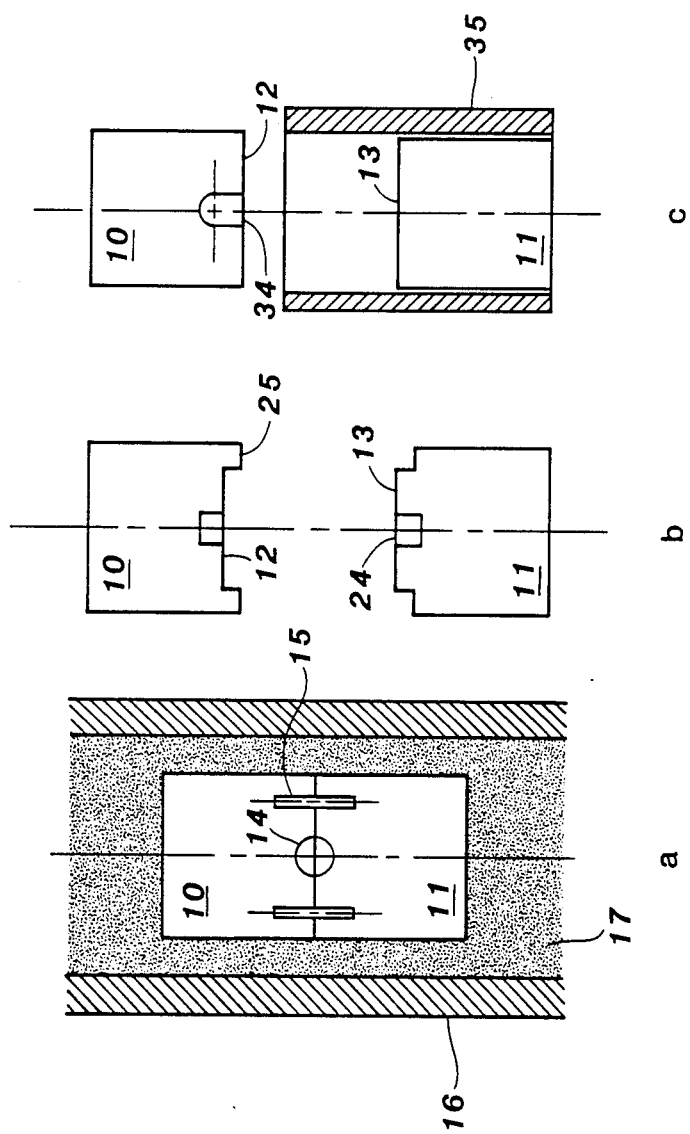
FIG. 1a shows a first embodiment of the apparatus used to practice the invention where a pair of hemispherical cavities are used to form a single void.
FIG. 1b shows an embodiment of a glass configuration used to practice the invention where a pair of cylindrical bores are used to form a single void.
FIG. 1c shows still another embodiment of the glass configuration used to practice the invention, where a single bore is used to form a void of known volume.

Referring to the accompanying drawings, FIGS. 1a–1c show cross-sectional views of three embodiments of the apparatus used to perform the subject invention. In FIG. 1a, a pair of glass rods 10 and 11 are joined to form a single glass body. Hemispherical cavities 14 are cut in each rod which opens onto the abutting faces of the glass rods 10 and 11 to form a single void of known volume when the rods are joined. These hemispherical cavities may be drilled or formed in any known manner.

Although there are several ways to form a void of known volume within a glass body, the simplest way is to join a pair of glass rods together to form the glass body. In this way a cavity can be cut or shaped in the end of one or both of the glass rods prior to joining them together. The rods are joined merely by abutting the ends of the rods together and having locating pins or other locating means. In the embodiment shown in FIG. 1a locating pins 15 are used to assure that the hemispherical holes 14 align to form a single volume.

In the preferred embodiment of the invention the adjoining faces 12 and 13, shown clearly in FIGS. 1b and 1c, are polished to lessen difficulties which may result due to the presence of microbubbles. When the principal bubble rises from its original position in the viscous glass, it carries with it these microbubbles formed from irregularities in the abutting surfaces. A "tail" formed by the microbubbles may usually be "outrun" by the principal bubble if it is allowed to rise sufficiently far from the glass joint. That is, because the velocity of the large bubble is greater than the velocity of the microbubbles, the large bubble will break away from the microbubble tail after rising several centimeters. It has been found that separation is improved when the extraneous bubbles are small. By polishing the surfaces 12 and 13, a known volume can also be more easily obtained and many of these microbubbles will be eliminated. Optical quality glass is preferred to minimize the presence of microbubbles which are characteristic of standard (nonoptical) quality glass.

According to the practice of the subject invention, the glass rods 10 and 11 are placed together and heated to the glass working point which is approximately 1252° C. for a borosilicate glass (Pyrex ®) having a composition by weight of: 80.5% $SiO_2$, 3.8% $Na_2O$, 0.4% $K_2O$, 12.9% $B_2O_3$, and 2.2% $Al_2O_3$ (98.8%) and approximately 1005° C. for a soda-lime-silica material. A bubble forms due to surface tension and rises within the glass body. After the bubble has achieved a high degree of sphericity, the glass body is cooled, suspending the bubble within the glass body. It should be noted that the bubble does not necessarily have the same volume as the original cavity because of the expansion of the gas due to heating.

A glass shell is formed by removing the excess solidified glass by grinding and three-point lapping the outside surface to desired specification. Both the grinding and three-point lapping procedures are known techniques. The three-point lapping technique results in a glass shell having uniform wall thickness. Conventional optical and air balancing techniques are used to assure that uniform wall thickness results.

The temperature of the glass body is controlled so that the buoyant forces are slightly greater than the viscous drag thereby allowing the bubble to rise slowly through the glass body. If the temperature is too high, resulting in a viscosity which is too low, the spherical void will rise quickly, resulting in distortion. When the bubble becomes spherical and rises above microbubbles which might be present, the glass body is cooled to increase the viscosity of the glass body.

In practice, the glass rods are held together and inserted into a refractory tube 16. The refractory tube can be made of any refractory material, such as mullite. In order to prevent the viscous glass from sticking to the mullite at high temperatures, alumina or silica powder 17 is poured between the glass rods and the refractory tube. The entire assembly is then heated as described above.

In a second embodiment of the apparatus used to practice the invention, cylindrical cavities 24 are used to form a void of known volume as shown in FIG. 1b. Rather than using a locating pin 15 as shown in FIG. 1a, a locating step 25 may be used to assure that the cylindrical cavities 24 are aligned. Naturally, any locating means can be used with any of the methods for forming the void of known volume.

In yet another configuration for practicing the invention, shown in FIG. 1c, a single cylindrical cavity 34 is shown in one of the glass rods to be joined. While FIG. 1c shows the cylindrical cavity to be spherically tipped, it is possible to practice the invention with a cavity having almost any shape of known volume. Also shown in FIG. 1c is a third method of aligning the glass rods. In this embodiment, a locating sleeve 35 is used to align the glass rods. Note that FIGS. 1b and 1c do not show a refractory tube and powder. This was done to simplify the figures. In actual use, a refractory tube and powder may be used in the embodiments shown in FIGS. 1b and 1c in a manner similar to that shown in FIG. 1a.

Figure 2:
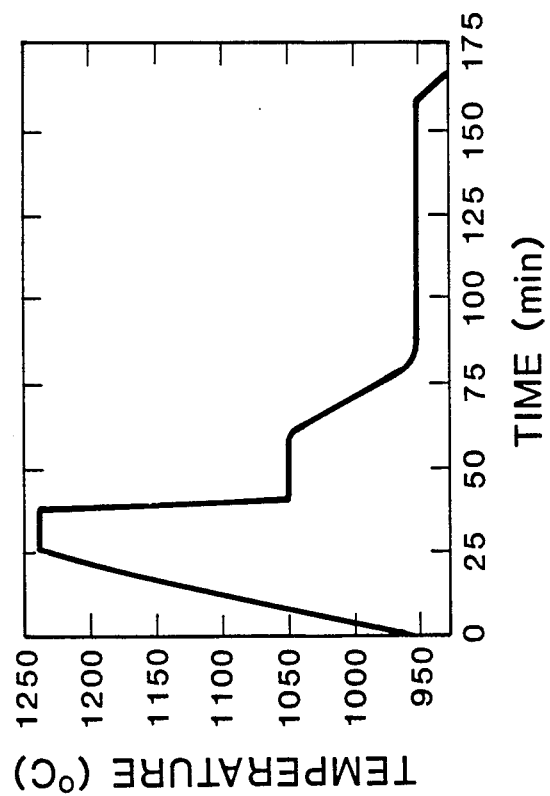
FIG. 2 illustrates one typical time-temperature history for practicing the subject invention.

A number of time-temperature profiles can be used to practice the invention. Because many glasses have a low coefficient of thermal expansion, it is possible to heat the glass quickly. If the material used to form the bubble is susceptible to thermal stress fracturing, it may be necessary to heat and cool the material slowly or to heat and cool the material uniformly. A typical time-temperature profile is shown in FIG. 2. A Pyrex ® body was heated from 950° C. to approximately 1240° C. over a period of about 25 minutes. The glass was held at this temperature for about 15 minutes and then transferred to a heater which would enable a sustained annealing temperature. The material, as shown, was heated at 1050° C. for approximately 20 minutes and then cooled to 950° C. over a period of 75 minutes to anneal the glass. The glass could then be cooled to room temperature. Using this profile, a Pyrex ® bubble was formed which had a distortion of 0.1%.

Figure 3:
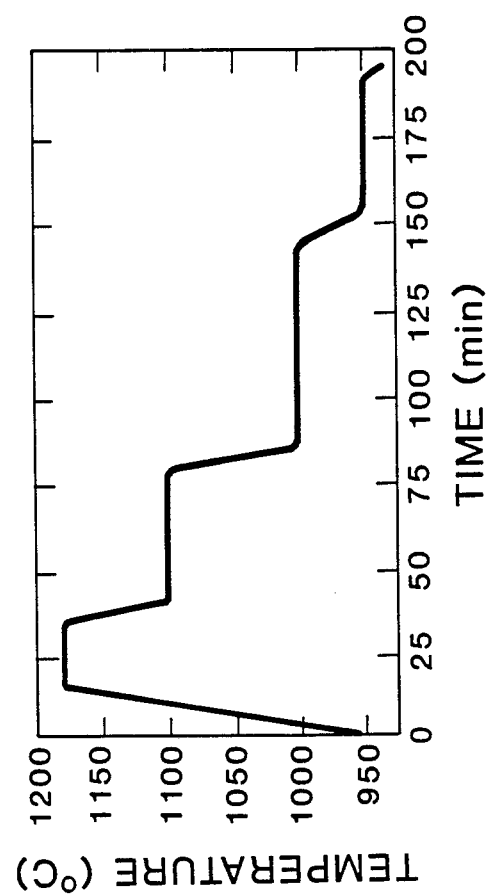
FIG. 3 illustrates a second time-temperature history which can be used to practice the subject invention.

In a second example, the time-temperature profile shown in FIG. 3 was used to produce a glass shell having a distortion of 0.3%. In this example, Pyrex ® was heated from 950° to 1175° C. over a period of 20 minutes and sustained this working temperature for a period for approximately 20 more minutes. The Pyrex ® was then cooled in a series of steps as shown in FIG. 3. When a fast moving bubble in the viscous glass is decelerated quickly, there is a tendency for the bubble to distort into an oblate spheroid. By increasing the number of cooling steps and therefore controlling the deceleration of the bubble, the distortion is substantially decreased.

Figure 4:
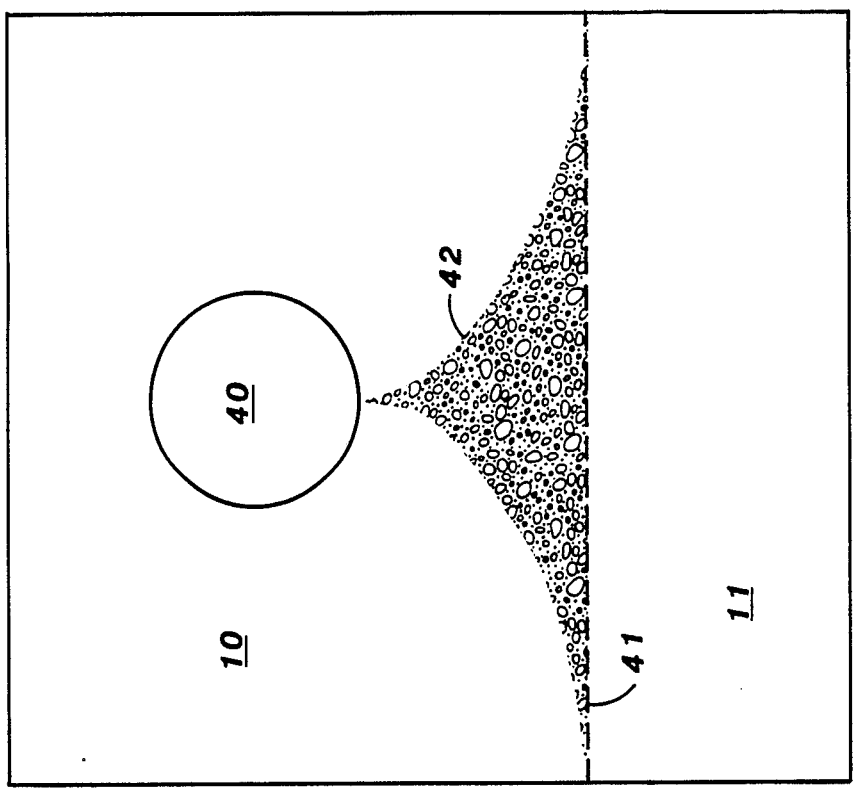
FIG. 4 illustrates the spherical cavity formed by the method of the invention prior to removing the excess glass to form a hollow sphere.

FIG. 4 is a schematic illustration of the invention after a bubble has formed, but prior to cutting the excess glass. As shown, the bubble 40 has risen above the joining plane 41 of the two glass rods 10 and 11. The joining plane is an imaginary line after the glass has been heated beyond its working point. FIG. 4 also shows microbubbles 42 which can form as described above. If the large bubble is allowed to rise, it will separate from most of the microbubbles because it has a higher velocity. This phenomenon is also depicted in the schematic.

The foregoing description of three embodiments of the invention has been presented for purposes of illustration and description. It is not intended to be exhaustive or to limit the invention to the precise forms disclosed. For example, although the shells in the examples were produced using glass, it is anticipated that a number of other materials could be used to practice the invention. Similarly, although only three geometries were shown for the cavity, an arbitrary geometry can be used to practice the invention. In addition, although glass rods are described and shown, any geometry can be used as the original body. The embodiments and uses of the invention were chosen and described to best explain the principles of the invention and its practical application to thereby enable others of ordinary skill in the art to best utilize the invention in various embodiments and with various modifications as are suited to the particular use contemplated. It is intended that the scope of the invention be defined by the claims appended hereto.

What is claimed is:

1. A method for producing uniform glass spheres, comprising the steps of;
    a. forming a cavity of known volume having its opening in one end of a first glass rod;
    b. joining said first glass rod with a second glass rod by abutting the end of the second glass rod with the end of the first glass rod having the cavity therein so that a void of known volume is formed;
    c. heating said glass rods to a temperature effective for surface tension about said void to form said void to a substantially spherical volume bubble;
    d. maintaining said temperature for a time sufficient for said bubble to rise within said glass rods;

e. cooling said glass rods to suspend said glass bubble within said glass rods; and f. removing said glass from around the bubble to form a glass sphere.

2. The method of producing glass spheres as described in claim 1, further comprising the step of forming a second cavity of known volume having its opening in one end face of said second glass rod prior to joining said first and second glass rods; and substantially aligning the cavity formed in said second glass rod with the cavity formed in said first glass rod, forming a single void of known volume.

3. The method for producing glass spheres as described in claim 2, wherein the cavities formed in the first and second glass rods are hemispherical.

4. The method for producing glass spheres as described in claim 2, wherein the cavities formed in said first and second glass rods are cylindrical.

5. The method for producing glass spheres as described in claim 2, wherein the cavities formed in said first and second glass rods are substantially cylindrical and have spherical terminations.

6. The method for producing glass spheres as described in claim 2, further comprising the step of polishing the ends of the glass rods to be joined.

7. A method of producing hollow spherical bodies comprising the steps of;

a. forming a cavity of known volume in one face of a first rod;

b. joining said first rod with a second rod by abutting the face of said first rod with the face of said second rod so that a void of known volume is formed;

c. heating said rods to a temperature effective for surface tension about said void to form said void to a substantially spherical volume bubble;

d. cooling said rod to suspend said bubble within said rod; and e. cutting away access material from around said bubble to form a spherical shell.

8. The method for producing glass spheres as defined in claim 1, wherein the cavity formed in the first glass rod is hemispherical.

9. The method for producing glass spheres as defined in claim 1, wherein the cavity formed in the first glass rod is cylindrical.

10. The method for producing glass sheres as defined in claim 1, wherein the cavity formed in the first glass rod is substantially cylindrical having a hemispherical termination.

11. The method of producing glass spheres as described in claim 1, further comprising the step of polishing the ends of the glass rods to be joined.

12. The method of producing hollow spherical bodies as described in claim 2, further comprising in the step of maintaining said temperature for a time sufficient for said bubble to rise in said rods.

13. The method of producing hollow spherical bodies as described in claim 12, further comprising the step of forming a cavity of known volume in the corresponding face of said second rod prior to abutting said first and second rods, and aligning the cavity in said first rod with the cavity in said second rod so that a single void of known volume is formed.

* * * * *